US011808365B2

(12) United States Patent
Parish et al.

(10) Patent No.: US 11,808,365 B2
(45) Date of Patent: Nov. 7, 2023

(54) VALVE SYSTEM CONFIGURED TO PREVENT CORROSION AT PROCESS LIQUID/VAPOR INTERFACE

(71) Applicant: Flowserve Pte. Ltd., Singapore (SG)

(72) Inventors: Paul Jeffrey Parish, Spanish Fork, UT (US); Michael P. Nelson, Lehi, UT (US)

(73) Assignee: Flowserve Pte. Ltd., Singapore (SG)

( * ) Notice: Subject to any disclaimer, the term of this patent is extended or adjusted under 35 U.S.C. 154(b) by 235 days.

(21) Appl. No.: 17/485,666

(22) Filed: Sep. 27, 2021

(65) Prior Publication Data

US 2023/0099720 A1    Mar. 30, 2023

(51) Int. Cl.
*F16K 24/02*    (2006.01)
*F16K 1/54*    (2006.01)
*F16K 39/02*    (2006.01)
*F16K 37/00*    (2006.01)

(52) U.S. Cl.
CPC ............... *F16K 1/54* (2013.01); *F16K 24/02* (2013.01); *F16K 37/0066* (2013.01); *F16K 39/026* (2013.01); *F16K 2200/402* (2021.08)

(58) Field of Classification Search
CPC .............. F16K 24/02; F16K 37/0066; F16K 2200/402; Y10T 137/3112
See application file for complete search history.

(56) References Cited

U.S. PATENT DOCUMENTS 2,209,296 A    7/1940  Warren
2,254,472 A    9/1941  Dahl
3,110,319 A   11/1963  Yoshiaki
3,120,600 A    2/1964  True
6,883,534 B2   4/2005  Ball
(Continued)

FOREIGN PATENT DOCUMENTS

JP        61139376 U       8/1986
KR     20030043643 A       6/2003
KR   1020180015878 A       2/2018

OTHER PUBLICATIONS

International Search Report and Written Opinion for PCT Application No. PCT/US2022/043352 dated Jan. 5, 2023, 13 pages.
(Continued)

*Primary Examiner* — Kevin F Murphy
(74) *Attorney, Agent, or Firm* — Maine Cernota & Rardin

(57) ABSTRACT

A valve system for controlling a corrosive process liquid flow, while avoiding corrosion due to a liquid/vapor interface of the process liquid, causes the process liquid to flow from the valve through a purge port into a vertical segment of a purge line. During valve initialization, a non-reactive gas backpressure within the purge line is controlled to establish the liquid/vapor interface at a desired height within the vertical segment, as determined by an interface level sensor, which can be ultrasonic. The vertical segment is constructed from, or lined with, a material that can withstand contact with the liquid/vapor interface. During valve operation, the non-reactive gas pressure can continue to be regulated, or a purge valve can be shut, trapping a fixed quantity of the non-reactive gas within the purge line. The valve can include a heater configured to prevent a molten process liquid from solidifying within the valve.

17 Claims, 5 Drawing Sheets

(56) References Cited

U.S. PATENT DOCUMENTS

| | | | |
|---|---|---|---|
| 8,950,425 B1 | 2/2015 | Jansen | |
| 9,104,208 B2* | 8/2015 | Vasquez | G05D 16/0694 |
| 9,255,649 B2* | 2/2016 | Coleman | F17D 5/02 |
| 9,322,487 B2* | 4/2016 | Wood, Jr. | G21D 1/02 |
| 2015/0240968 A1 | 8/2015 | Coleman | |
| 2019/0226937 A1 | 7/2019 | Glime, III | |
| 2020/0300384 A1 | 9/2020 | Ijima | |

OTHER PUBLICATIONS

International Search Report and Written Opinion for PCT Application No. PCT/US2022/043341 dated Jan. 10, 2023, 10 pages.
Notice of Allowance for U.S. Appl. No. 17/485,676 dated Aug. 8, 2022, 5 pages.
Corrected Notice of Allowance for U.S. Appl. No. 17/485,676 dated Aug. 12, 2022, 5 pages.
Corrected Notice of Allowance for U.S. Appl. No. 17/485,676 dated Jan. 19, 2023, 6 pages.
Office Action for U.S. Appl. No. 17/485,676 dated Jul. 19, 2022, 9 pages.

* cited by examiner

VALVE SYSTEM CONFIGURED TO PREVENT CORROSION AT PROCESS LIQUID/VAPOR INTERFACE

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to valves, and more particularly, to valves that are used to control a flow of a liquid having a corrosive liquid/vapor interface.

BACKGROUND OF THE INVENTION

Some process valves are required to control a flow of a corrosive liquid. Molten salt is an example of such a material, and is becoming of increasing importance to processes in several industries, including the concentrated solar power (CSP) industry and the thorium-based nuclear power industry. For example, in some CSP plants, solar heat is concentrated into a flow of molten salt, which has a high thermal capacity, that is circulated in a process control system. The heat is transferred from the molten salt to create steam which, in turn, is used to generate electricity.

To optimize the system for higher operating efficiencies, different types of salts with different characteristics are used. These salts can be highly corrosive in the liquid state. Furthermore, some of the molten salt typically vaporizes at high temperatures and creates a salt vapor or gas above the liquid salt level. The salt vapor or gas can also be highly corrosive.

In many cases, even the smallest amount of external valve leakage of the corrosive liquid is considered to be unacceptable. In such cases, a bellows seal valve is often used. With reference to the sectional diagram of FIG. 1, a bellows seal valve comprises an accordion-like bellows 100. One end 102 of the bellows 100 is welded or otherwise attached to the valve stem 104. The other end 106 of the bellows 100 is welded to a part 108 that is clamped or otherwise attached to the valve bonnet 109. When operating the valve, the valve stem 104 is moved in a linear valve stroke so as to control the position of a valve plug 110 relative to a valve seat 112. During the valve stroke, the bellows 100 compresses or expands along with the linear motion of the sliding valve stem 104.

Since the bellows 100 has a static seal at each end 102, 106, and the circumference of the valve stem 104 is covered by the bellows 100, a metal barrier between the process liquid inside of the valve and the external atmosphere is provided, eliminating leakage at the valve stem 104. In the example of FIG. 1, the process liquid is outside of the bellows 100, and the atmosphere is inside of the bellows 100. For other bellows valves, the process liquid is inside of the bellows 100 and the atmosphere is outside of the bellows 100. It is intrinsic to the design of a bellows valve that there is a substantial internal volume that is normally filled by the process liquid. In particular, the process liquid is generally in contact with either the inner or outer surface of the bellows 100 along its entire length.

It has been observed that for some corrosive liquids, including molten salts, the environment at the liquid/vapor interface is even more corrosive than either the liquid or the vapor when considered separately. Accordingly, materials that have sufficient corrosion resistance to withstand a corrosive liquid such as molten salt, and can even withstand contact with the corrosive vapor generated by the liquid, may nevertheless be inadequate to withstand the corrosive nature of the liquid/vapor interface. In many cases, it is mechanically impossible, and/or much too expensive, to construct an entire valve from a material that is resistant to the liquid/vapor interface, or even to line with a liquid/vapor resistant material all of the surfaces of a valve that may potentially contact the corrosive liquid and/or its vapor.

What is needed, therefore, is a valve system that is configured to prevent corrosion or damage due to contact with a corrosive liquid/vapor interface, without requiring that all portions of the valve system that may potentially contact the corrosive liquid and/or its vapor be constructed from, or lined with, a material that is resistant to corrosion by the liquid/vapor interface.

SUMMARY OF THE INVENTION

The present invention is a valve and associated corrosion control system that are configured to control a flow of a corrosive process liquid while preventing corrosion or damage due to contact with a corrosive liquid/vapor interface of the process liquid, and without requiring that all portions of the valve that may potentially contact the corrosive liquid and/or its vapor be constructed from, or lined with, a material that is resistant to corrosion by the liquid/vapor interface. In embodiments, the valve is a bellows valve.

According to the present invention, the valve includes a "purge port" that enables liquid communication between an internal process liquid volume of the valve that is normally filled with a corrosive process liquid and a purge line that is part of the corrosion control system. During normal operation of the valve, a backpressure of a non-reactive gas, such as nitrogen gas, is established in the purge line, such that process liquid enters a vertical segment of the purge line, but is prevented from flowing beyond the vertical segment by the backpressure of the non-reactive gas.

The corrosion control system further includes an interface level sensor that is able to sense the level of the liquid/vapor interface within the vertical segment. In embodiments, the interface level sensor is an ultrasonic sensor. In various embodiments, the corrosion control system further includes a source of the non-reactive gas and a pressure regulator that is able to control the backpressure of the non-reactive gas in the vertical segment. Embodiments also include a controller that is configured to establish and maintain the liquid/vapor interface within the vertical segment.

According to embodiments of the disclosed method, when the valve is first put into service, it is initially filled and pressurized with the non-reactive gas. Then the process liquid is applied to an inlet of the valve, and the pressure of the non-reactive gas is slowly lowered, thereby allowing the corrosive process liquid to flow into the internal process liquid volume of the valve, and from thence through the purge port and into the purge line. Once the corrosive process liquid has entered the vertical segment of the purge line, the pressure of the non-reactive gas is adjusted until it reaches a backpressure that causes the liquid/vapor interface of the corrosive process liquid to be stabilized at a desired height within the vertical segment, as determined by the interface level sensor. According to the present invention, the liquid/vapor interface subsequently remains within the vertical segment during operation of the valve.

In some of these embodiments, regulation of the non-reactive gas backpressure continues during the operation of the valve, for example by causing a controller to periodically or continuously adjust a backpressure regulator according to liquid/vapor interface level measurements that are made by the interface level sensor. In other embodiments, once an appropriate non-reactive gas backpressure is established within the purge line, a purge valve located downstream of the vertical segment is closed, so that a fixed quantity of the non-reactive gas remains enclosed within a fixed volume of the purge line between the purge valve and the liquid/vapor interface within the vertical segment. If the liquid pressure of the corrosive process liquid fluctuates, for example due to temperature or flow rate fluctuations of the process liquid, this is accommodated, in embodiments, by a small shifting of the liquid/vapor interface level within the vertical segment as the non-reactive gas within the fixed volume is compressed or allowed to expand.

According to the present invention, the vertical segment is made from, or lined with, a material that is resistant to corrosion due to contact with the liquid/vapor interface. Examples include an anti-corrosion tungsten liner and a tungsten carbide thermal spray coating, among other materials and coatings. Corrosion and damage due to contact between the valve system and the liquid/vapor interface of the corrosive process liquid is thereby avoided by maintaining the liquid/vapor interface within the corrosion resistant vertical segment, without requiring that any portion of the valve or any other portion of the purge line be constructed from, or lined with, a material that is resistant to corrosion by the liquid/vapor interface of the process liquid.

In embodiments, the valve further includes a heater that is configured to heat the valve, thereby maintaining a molten process substance, such as molten salt, as a liquid within the valve during normal operation. In embodiments, the heater can also be used, if needed, to re-melt the process substance if it cools and becomes solidified within the valve, for example due to a process interruption.

Much of the following discussion is directed to exemplary embodiments where the valve is a bellows valve, and where the process liquid within the valve is molten salt that is in contact with the external side of the bellows. However, one of skill in the art will be easily able to adapt the principles of the present invention to virtually any type of valve system that controls a corrosive process liquid, including a bellows valve in which the process liquid occupies the interior of the bellows, and also including valves that are not bellows valves. It will also be understood that the present invention is not limited to systems that control a flow of molten salt, but extends to all valve systems that control a flow of a corrosive liquid having a liquid/vapor interface that is more corrosive than either the liquid or the vapor when considered separately.

One general aspect of the present invention is a valve system configured for controlling a flow of a corrosive process liquid, a liquid/vapor interface of the process liquid being more highly corrosive than either the process liquid or the vapor thereof when considered separately. The valve system includes a valve having an internal process liquid volume that is normally filled with the process liquid during operation of the valve, a purge port provided in the valve, the purge port enabling liquid communication between the internal process liquid volume and an external purge line, a vertical segment included in the purge line, said vertical segment being constructed from or lined with a material that is resistant to corrosion due to contact between the vertical segment and the liquid/vapor interface of the process liquid, an interface level sensor configured to determine a level of the liquid/vapor interface within the vertical segment, and a non-reactive gas source configured to fill a downstream segment of the purge line that is downstream of the liquid/vapor interface with a non-reactive gas having a backpressure that causes process liquid entering the purge line to enter into the vertical segment, while preventing the process liquid from flowing beyond the vertical segment.

Embodiments further include a pressure regulator configured to regulate a pressure of the non-reactive gas within the purge line.

In any of the above embodiments, the liquid/vapor interface sensor can be an ultrasonic sensor.

Any of the above embodiments can further include a pressure controller that is configured to control the pressure of the non-reactive gas within the purge line so as to establish the liquid/vapor interface level within the vertical segment. Some of these embodiments further include an interface level controller that is configured to control the pressure controller according to measurements made by the interface level sensor so as to establish the liquid/vapor interface of the process liquid at a desired height within the vertical segment.

Any of the above embodiments can further include a pressure sensor included in the purge line and configured to measure a pressure of the non-reactive gas within the purge line.

Any of the above embodiments can further include a temperature sensor included in the purge line and configured to measure a temperature of the non-reactive gas in the purge line.

Any of the above embodiments can further include a gas vent configured to vent the non-reactive gas from the purge line.

Any of the above embodiments can further include a valve heater controlled by a heat controller.

In any of the above embodiments, the valve can be a bellows valve.

In any of the above embodiments, the process liquid can be molten salt.

In any of the above embodiments, the material that is resistant to corrosion due to contact between the vertical segment and a liquid/vapor interface of the process liquid can include at least one of a tungsten liner and a tungsten carbide thermal spray coating applied to the vertical segment.

A second general aspect of the present invention is a method of initializing a flow through a valve of a corrosive process liquid, a liquid/vapor interface of the process liquid being more highly corrosive than either the process liquid or the vapor thereof when considered separately. The method includes:

A) providing a valve system according to claim 1;
   B) introducing a non-reactive gas into the purge line, so that the non-reactive gas fills the internal process liquid volume within the valve;
   C) applying the process liquid to an inlet of the valve;
   D) reducing a pressure of the non-reactive gas within the valve, thereby allowing the process liquid to fill the internal process liquid volume, and to flow therefrom through the purge port and into the purge line; and
   E) establishing a backpressure of the non-reactive gas within the purge line that causes the process liquid to enter the vertical segment, while preventing the process liquid from flowing beyond the vertical segment, thereby establishing a liquid/vapor interface of the process liquid within the vertical segment.

In embodiments, step E) includes using the interface level sensor to determine a height of the liquid/vapor interface within the purge line. In some of these embodiments step E) includes establishing the liquid/vapor interface of the process liquid at a desired height within the vertical segment. And some of these embodiments further include, after step E), continuing to control and adjust the backpressure of the non-reactive gas within the purge line so as to maintain the liquid/vapor interface at the desired height within the vertical segment.

And any of the above embodiments can further include, after step E), closing a purge valve that is upstream of the vertical segment, thereby establishing a fixed quantity of the non-reactive gas within a fixed volume of the purge line that extends between the liquid/vapor interface and the purge valve.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a valve and associated corrosion control system that are configured to control a flow of a corrosive process liquid while preventing corrosion or damage due to contact with a corrosive liquid/vapor interface of the process liquid, and without requiring that all portions of the valve that may potentially contact the corrosive liquid and/or its vapor be constructed from, or lined with, a material that is resistant to corrosion by the liquid/vapor interface. In embodiments, the valve is a bellows valve.

Figure 1:
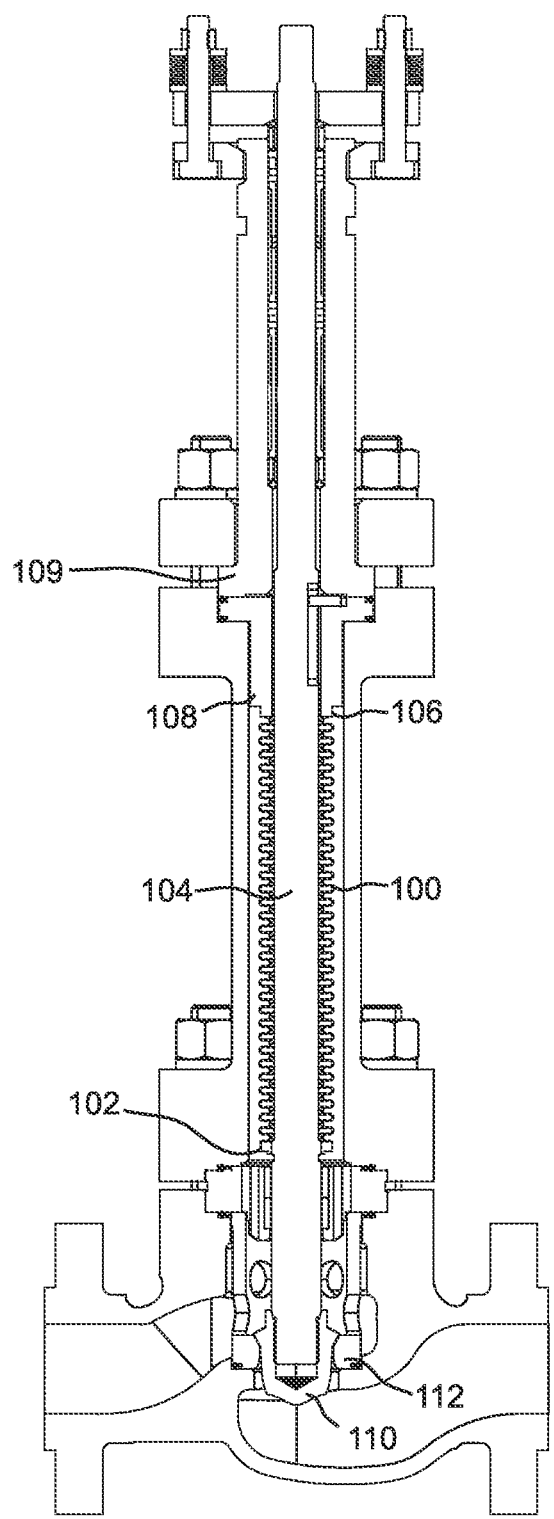
FIG. 1 is a sectional view drawn to scale of a bellows valve of the prior art.
Figure 2:
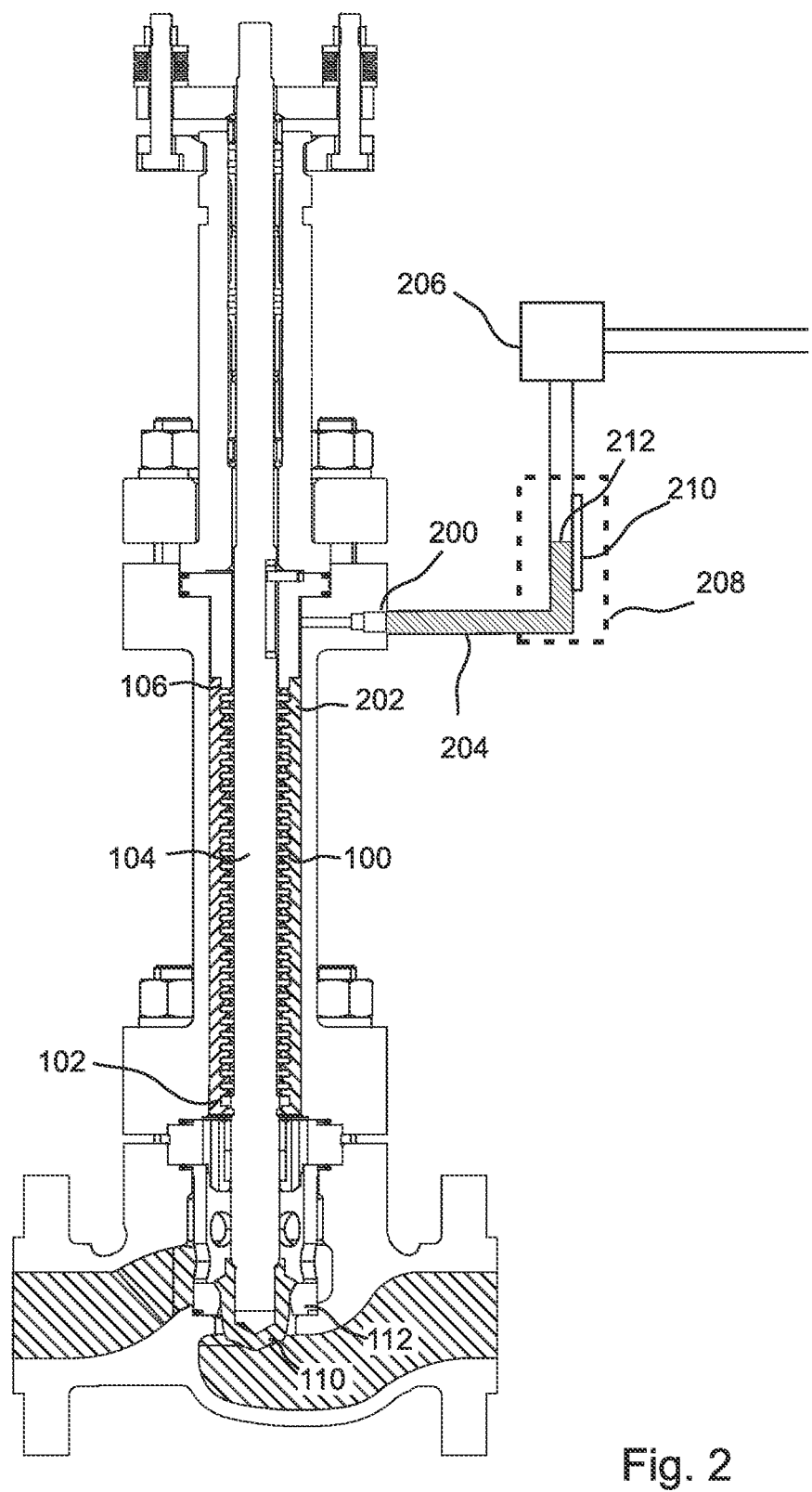
FIG. 2 is a sectional view drawn to scale of an embodiment of the present invention.

With reference to FIG. 2, according to the present invention the valve includes a "purge port" 200 that enables liquid communication between an internal process liquid volume 202 of the valve that is normally filled with the corrosive process liquid and a purge line 204 that is associated with a corrosion control system 206. During normal operation of the valve, a backpressure of a non-reactive gas, such as nitrogen gas, is established in the purge line 204, such that process liquid enters a vertical segment 208 of the purge line 204, but is prevented from flowing beyond the vertical segment 208 by the backpressure of the non-reactive gas.

According to the present invention, the vertical segment 208 is made from, or lined with, a material that is resistant to corrosion due to contact with the liquid/vapor interface 212. Examples include an anti-corrosion tungsten liner and a tungsten carbide thermal spray coating, among other materials and coatings. The valve system further includes an interface level sensor 210, such as an ultrasonic sensor, that is able to detect the level of the liquid/vapor interface 212 within the purge line 204. In some of these embodiments, the backpressure of the non-reactive gas is regulated 408 to adjust the liquid/vapor interface 212 to be at a desired level within the vertical segment 208.

Figure 3:
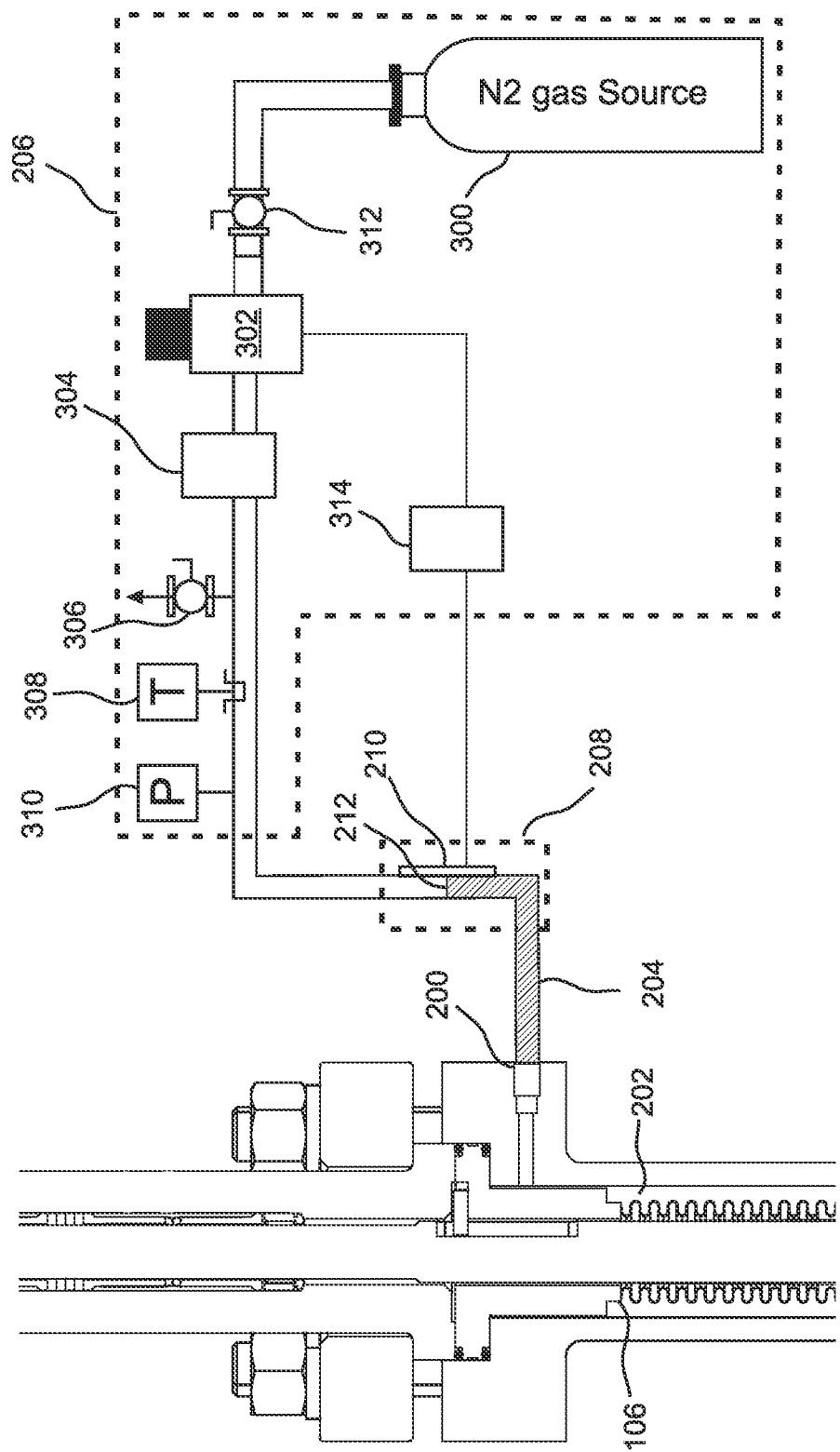
FIG. 3 is close-up sectional view of a portion of the valve of FIG. 2, shown connected to a corrosion control system, the valve being drawn to scale.

With reference to FIG. 3, in embodiments the corrosion control system 206 further includes a source of 300 a non-reactive gas, such as nitrogen gas, a purge valve 312 that is configured to isolate the source 300 from the vertical segment, and a pressure regulator 302 that is able to control the pressure of the non-reactive gas in the purge line 204. The illustrated embodiment further includes a controller 314 that is configured to establish and maintain the liquid/vapor interface 212 within the vertical segment 208. In the embodiment of FIG. 3, the purge line 204 also includes a gas heater 304 and a gas vent 306, as well as temperature 308 and pressure 310 sensors.

Figure 4:
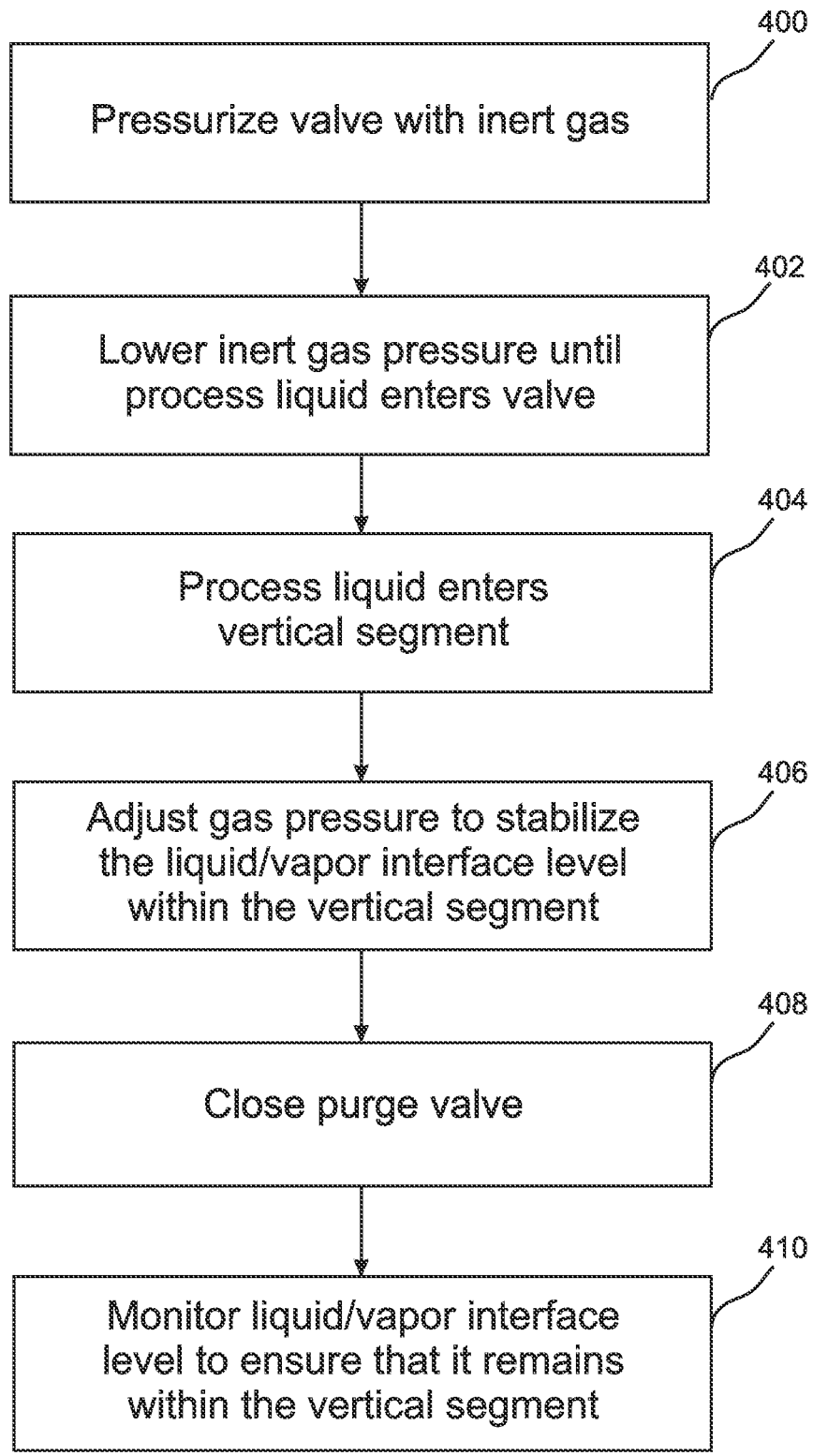
FIG. 4 is a flow diagram illustrating a method for implementing the disclosed valve in an embodiment of the present invention.

With reference to FIG. 4, according to embodiments of the disclosed method, when the valve is put into service, it is initially filled and pressurized with the non-reactive gas 400. Then the process liquid is applied to an inlet of the valve, and the pressure of the non-reactive gas is slowly lowered 402, thereby allowing the corrosive process liquid to flow into the internal process liquid volume 202 of the valve, and from thence through the purge port 200 and into the purge line 204. Once the corrosive process liquid has entered 404 the vertical segment 208 of the purge line 204, the pressure of the non-reactive gas is adjusted 406 until it reaches a backpressure that causes the liquid/vapor interface 212 of the corrosive process liquid to be stabilized at a desired height within the vertical segment 208, as determined by the interface level sensor 210. According to the present invention, the liquid/vapor interface 212 subsequently remains within the vertical segment 208 during operation of the valve.

In some embodiments, regulation of the non-reactive gas backpressure continues during the operation of the valve, for example by causing the controller 314 to periodically or continuously adjust the pressure regulator 302 according to liquid/vapor interface level measurements that are made by the interface level sensor 210.

In the embodiment of FIG. 4, once an appropriate non-reactive gas backpressure is established within the purge line 204, the purge valve 312, which is located downstream of the vertical segment 208, is closed 408, so that a fixed quantity of the non-reactive gas remains enclosed within a fixed volume of the purge line 204 that extends between the purge valve 312 and the liquid/vapor interface 212 within the vertical segment 208. If the liquid pressure of the corrosive process liquid fluctuates, for example due to temperature or flow rate fluctuations of the process liquid, this is normally accommodated, in embodiments, by a small shifting of the liquid/vapor interface level 212 within the vertical segment 208 as the non-reactive gas within the fixed volume is compressed or allowed to expand. In the embodiment of FIG. 4, the controller 314 continues to monitor 410 the liquid/vapor interface level 212, as measured by the interface sensor 210, so that it can temporarily reopen the purge valve 312 and readjust the backpressure if needed.

Because the vertical segment 208 is made from, or lined with, a material that is resistant to corrosion due to contact with the liquid/vapor interface 212, corrosion and damage due to contact between the valve system and the liquid/vapor interface of the corrosive process liquid is avoided, without requiring that any portion of the valve or any other portion of the purge line be constructed from, or lined with, a material that is resistant to corrosion by the liquid/vapor interface of the process liquid.

Figure 5:
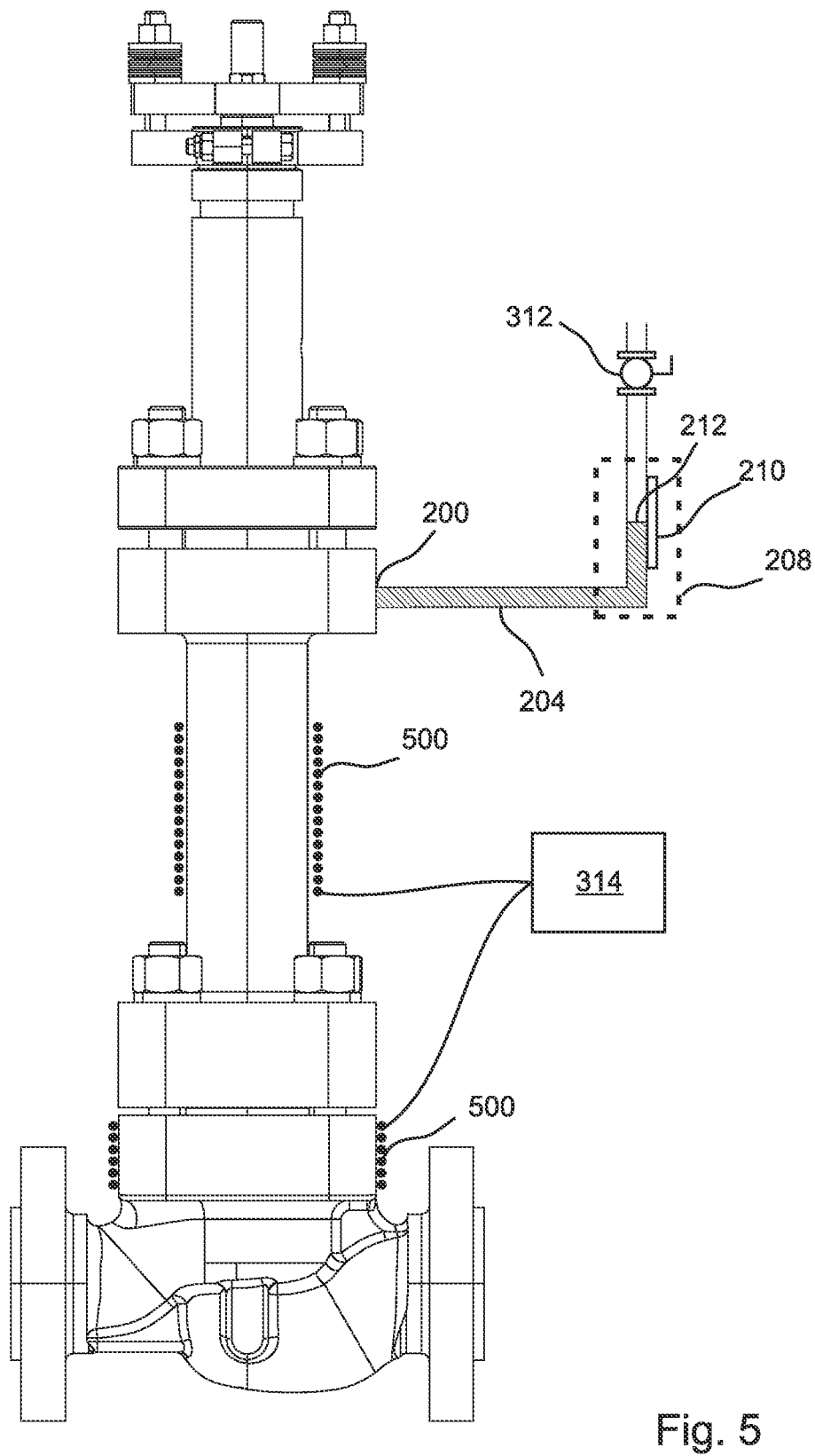
FIG. 5 is a side view, drawn to scale, of a valve similar to FIG. 2 that further includes a valve heater.

With reference to FIG. 5, in embodiments the valve further includes a heater 500 that is configured to heat the valve, thereby maintaining a molten process substance, such as molten salt, as a liquid within the valve during normal operation. In embodiments, the heater 500 can also be used, if needed, to re-melt the process substance if it cools and becomes solidified within the valve, for example due to a process interruption.

It will be noted that many of the drawings and the corresponding descriptions presented herein refer to exemplary embodiments in which the valve is a bellows valve, and wherein the process liquid within the valve is molten salt that is in contact with the external side of the bellows. However, one of skill in the art will be easily able to adapt the principles of the present invention to virtually any type of valve system that controls a corrosive process liquid, including a bellows valve in which the process liquid occupies the interior of the bellows, and also including valves that are not bellows valves. It will also be understood that the present invention is not limited to systems that control a flow of a molten material such as molten salt, but extends to all valve systems that control a flow of a corrosive liquid having a liquid/vapor interface that is more corrosive than either of the liquid and the vapor when considered separately.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A valve system configured for controlling a flow of a corrosive process liquid, a liquid/vapor interface of the process liquid being more highly corrosive than either the process liquid or the vapor thereof when considered separately, the valve system comprising:
    a valve having an internal process liquid volume that is normally filled with the process liquid during operation of the valve;
    a purge port provided in the valve, the purge port enabling liquid communication between the internal process liquid volume and an external purge line;
    a vertical segment included in the purge line, said vertical segment being constructed from or lined with a material that is resistant to corrosion due to contact between the vertical segment and the liquid/vapor interface of the process liquid;
    an interface level sensor configured to determine a level of the liquid/vapor interface within the vertical segment; and
    a non-reactive gas source configured to fill a downstream segment of the purge line that is downstream of the liquid/vapor interface with a non-reactive gas having a backpressure that causes process liquid entering the purge line to enter into the vertical segment, while preventing the process liquid from flowing beyond the vertical segment.

2. The valve system of claim 1, further comprising a pressure regulator configured to regulate a pressure of the non-reactive gas within the purge line.

3. The valve system of claim 1, wherein the liquid/vapor interface sensor is an ultrasonic sensor.

4. The valve system of claim 1, further comprising a pressure controller that is configured to control the pressure of the non-reactive gas within the purge line so as to establish the liquid/vapor interface level within the vertical segment.

5. The valve system of claim 4, further comprising an interface level controller that is configured to control the pressure controller according to measurements made by the interface level sensor so as to establish the liquid/vapor interface of the process liquid at a desired height within the vertical segment.

6. The valve system of claim 1, further comprising a pressure sensor included in the purge line and configured to measure a pressure of the non-reactive gas within the purge line.

7. The valve system of claim 1, further comprising a temperature sensor included in the purge line and configured to measure a temperature of the non-reactive gas in the purge line.

8. The valve system of claim 1, further comprising a gas vent configured to vent the non-reactive gas from the purge line.

9. The valve system of claim 1, further comprising a valve heater controlled by a heat controller.

10. The valve system of claim 1, wherein the valve is a bellows valve.

11. The valve system of claim 1, wherein the process liquid is molten salt.

12. The valve system of claim 1, wherein the material that is resistant to corrosion due to contact between the vertical segment and a liquid/vapor interface of the process liquid comprises at least one of a tungsten liner and a tungsten carbide thermal spray coating applied to the vertical segment.

13. A method of initializing a flow through a valve of a corrosive process liquid, a liquid/vapor interface of the process liquid being more highly corrosive than either the process liquid or the vapor thereof when considered separately, the method comprising:
    A) providing a valve system according to claim 1;
    B) introducing a non-reactive gas into the purge line, so that the non-reactive gas fills the internal process liquid volume within the valve;
    C) applying the process liquid to an inlet of the valve;
    D) reducing a pressure of the non-reactive gas within the valve, thereby allowing the process liquid to fill the internal process liquid volume, and to flow therefrom through the purge port and into the purge line; and E) establishing a backpressure of the non-reactive gas within the purge line that causes the process liquid to enter the vertical segment, while preventing the process liquid from flowing beyond the vertical segment, thereby establishing a liquid/vapor interface of the process liquid within the vertical segment.

14. The method of claim 13, wherein step E) includes using the interface level sensor to determine a height of the liquid/vapor interface within the purge line.

15. The method of claim 13, wherein step E) includes establishing the liquid/vapor interface of the process liquid at a desired height within the vertical segment.

16. The method of claim 15, further comprising, after step E), continuing to control and adjust the backpressure of the non-reactive gas within the purge line so as to maintain the liquid/vapor interface at the desired height within the vertical segment.

17. The method of claim 13, further comprising, after step E), closing a purge valve that is upstream of the vertical segment, thereby establishing a fixed quantity of the non-reactive gas within a fixed volume of the purge line that extends between the liquid/vapor interface and the purge valve.

* * * * *